United States Patent
Karlsson et al.

(10) Patent No.: US 8,711,979 B2
(45) Date of Patent: Apr. 29, 2014

(54) METHOD OF IMPROVING SENSITIVITY AND INTERFERENCE REJECTION IN WIRELESS RECEIVERS

(75) Inventors: Magnus Karlsson, Kungsängen (SE); Peter Bradley, Coogee (AU)

(73) Assignee: Microsemi Semiconductor AB (SE)

( * ) Notice: Subject to any disclaimer, the term of this patent is extended or adjusted under 35 U.S.C. 154(b) by 262 days.

(21) Appl. No.: 12/842,093

(22) Filed: Jul. 23, 2010

(65) Prior Publication Data

US 2011/0028113 A1 Feb. 3, 2011

(30) Foreign Application Priority Data

Jul. 31, 2009 (GB) .................................. 0913303.4

(51) Int. Cl.
*H04B 1/10* (2006.01)

(52) U.S. Cl.
USPC ........ 375/316; 375/317; 375/340; 455/343.1; 455/343.2; 370/340

(58) Field of Classification Search
USPC ............... 375/239, 316, 317, 340; 455/343.1, 455/343.2; 370/340; 607/30, 32
See application file for complete search history.

(56) References Cited

U.S. PATENT DOCUMENTS

| 6,201,993 | B1 * | 3/2001 | Kruse et al. ..................... 607/30 |
| 6,310,906 | B1 * | 10/2001 | Abarbanel et al. ............ 375/130 |
| 2006/0229053 | A1 | 10/2006 | Sivard | |

FOREIGN PATENT DOCUMENTS

| GB | 2428166 A | 1/2007 |
| KR | 2002078344 A | 10/2002 |
| KR | 2009052823 A | 5/2009 |

* cited by examiner

*Primary Examiner* — Shuwang Liu
*Assistant Examiner* — Ross Varndell
(74) *Attorney, Agent, or Firm* — Laubscher & Laubscher, P.C.

(57) ABSTRACT

A wireless receiver for receiving a signal with a characteristic pattern includes a predictor for predicting the presence of a non-zero value of the characteristic pattern. A tracker tracks a noise component in the received signal between predicted non-zero values. The resulting noise component is subtracted from the received signal to output a processed signal, which is then decoded by a pattern discriminator and demodulator. The wireless receiver is less sensitive to noise and interference.

18 Claims, 4 Drawing Sheets

METHOD OF IMPROVING SENSITIVITY AND INTERFERENCE REJECTION IN WIRELESS RECEIVERS

FIELD OF THE INVENTION

This invention relates to the field of wireless communication, and in particular to a method of improving sensitivity and interference rejection in a wireless receiver, and in particular a wireless receiver responsive to a particular signal pattern.

BACKGROUND OF THE INVENTION

In power saving receivers, for example, for medical applications, it is known to employ an ultra low power secondary receiver responsive to a characteristic signal pattern to turn on the primary receiver when there is data to send. Such an exemplary system is described in US2006/0229053A1, the contents of which are herein incorporated by reference. Such a system is typically based on Pulse Amplitude, Pulse Position or Pulse Width Modulation.

As with any kind of Amplitude Modulation technique, the performance is limited by Signal to Noise Ratio (SNR), which affects sensitivity or operational range. This limitation is especially problematic in an environment were inference is present. The presence of interference can degrade the performance of such AM systems significantly. Such degradation can render the wireless transceiver useless or impractical in view of latency and robustness requirements.

SUMMARY OF THE INVENTION

According to the present invention there is provided a wireless receiver for receiving an RF signal with an asynchronous characteristic pattern, comprising a pattern discriminator for detecting the characteristic pattern in the received signal in an asynchronous mode; a predictor for predicting the presence of a non-zero value of a subsequently received portion of the signal in pseudo synchronous mode; a tracker for tracking a noise component in the received signal between predicted non-zero values; a subtractor for subtracting the noise component from the received signal to output a processed signal; and a demodulator for demodulating the processed signal.

In one embodiment the invention may be applied to a Pulse Position Modulation Ultra Low Power Receiver (PPM-ULP-Rx) used as a "Wakeup receiver" as described in GB 2428166A. In accordance with embodiments of the invention, different recognizable characteristic patterns are used in combination with specific pattern discrimination and receiver operation control methods to enhance the performance of the receiver.

Thus, embodiments of this invention combine a method to synchronize the receiver to an incoming RF signal pattern, such as a Pulse Position Modulated signal, which by nature has an asynchronous characteristic. The embodiments comprise two modes of operation of the receiver, one asynchronous and hence non-coherent, and a second mode of operation, which can be referred to as pseudo-synchronous and hence almost coherent or pseudo-coherent.

The pseudo-synchronicity and pseudo-coherence reside in the fact that the method is based on a prediction method, which predicts where the expected signal can occur and due to this prediction can eliminate noise in the incoming signal where the wanted signal is not expected.

The Signal-to-Noise Ratio is further enhanced by the use of a Noise predictor, which tracks the noise in the intermediate periods where the receiver is not active. When a wanted signal is detected, the predictor is reset to allow prediction of consecutive wanted signals. This behaviour increases the resulting SNR and also rejects interference.

Embodiments of the invention also include a method for further interference rejection by use of an input signal pattern and level dependent dynamic sensitivity level. The invention is not limited to the use of PPM-ULP receivers but can be used elsewhere as anyone skilled in the art can comprehend. The invention is in particular useful where the modulation is built on non-event symbol/bit mark-space ratios, lengths or Signal-to-Noise Ratios.

In a preferred embodiment the invention includes an outer controlling sensitivity and repeat algorithm and an inner prediction and synchronization algorithm, which together control the embodied receiver architecture.

According to another aspect of the invention there is provided a method of enhancing sensitivity and interference rejection in an ultra low power duty cycled receiver responsive to an RF signal with an asynchronous characteristic signal pattern, comprising: detecting the presence of the asynchronous characteristic pattern in an asynchronous mode; predicting the presence of a non-zero value in a subsequently received portion of the signal in a pseudo-synchronous mode; tracking a noise component in the received signal between predicted non-zero values; subtracting the noise component from the received signal to output a processed signal; and demodulating the processed signal.

BRIEF DESCRIPTION OF FIGURES

The invention will now be described in more detail, by way of example only, with reference to the accompanying drawings, in which:—

DETAILED DESCRIPTION OF THE INVENTION

Figure 1:
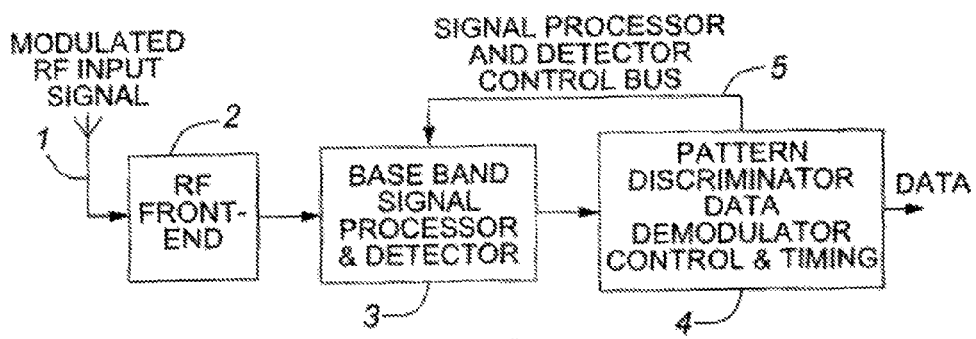
FIG. 1 is a principal block diagram of an exemplary ultra low power pulse position modulated receiver embodying the invention.

Referring to the exemplary embodiment shown in FIG. 1, the pulse position modulated RF input signal is received by the antenna 1 and passed to the RF Front-End 2, which amplifies and filters the RF signal. The front end 2 enhances the signal-to-noise ratio and reduces the effects of out of band interference.

The signal from the RF front end unit 2 is then passed to the base band signal processor and detector 3, where it is down-converted to base band and further filtered and amplified. This is where the first step in the pattern recognition and prediction process is performed. The output of the block signal processor and detector 3 is passed to the pattern discriminator, data demodulator, timing and control unit 4, where the next stage of the process is performed. In addition, a signal processor and detector control bus 5 is connected between the pattern discriminator data demodulator, timing and control unit 4 and the signal processor and detector 3.

Figure 2:
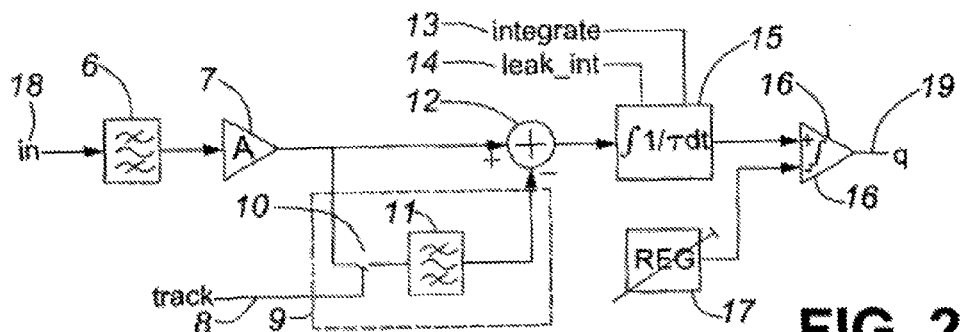
FIG. 2 is block diagram of the base band signal processor and detector.

FIG. 2 shows the base band signal processor and detector 3 in more detail. As shown therein, the input signal provided at the input port 18 is filtered in filter unit 6 and amplified in amplifier 7 to improve the Signal-to-Noise Ratio (SNR). To further enhance the interference rejection to slowly varying noise-like flicker or 1/f noise, a noise tracker or predictor 9 is used. The output signal from amplifier 7 is fed to the predictor/tracker 9, whose function is to assess the Low Frequency (LF) signal level (noise only or noise+interference) when a pulse is not present. The tracker includes a switch 10 and filter 11. The switch 10 is operated by a track signal 8.

The held predicted/tracked noise level is then subtracted by subtractor 12 from the output signal from amplifier 7. The difference signal is then integrated by an integrate-and-dump unit 15 with control inputs 13, 14. The output of unit 15 is fed to a comparator 16, which compares the output signal of unit 15 to a programmable constant reference acting as threshold provided by regulator unit 17, resulting in a quantized data output signal 19.

Figure 5:
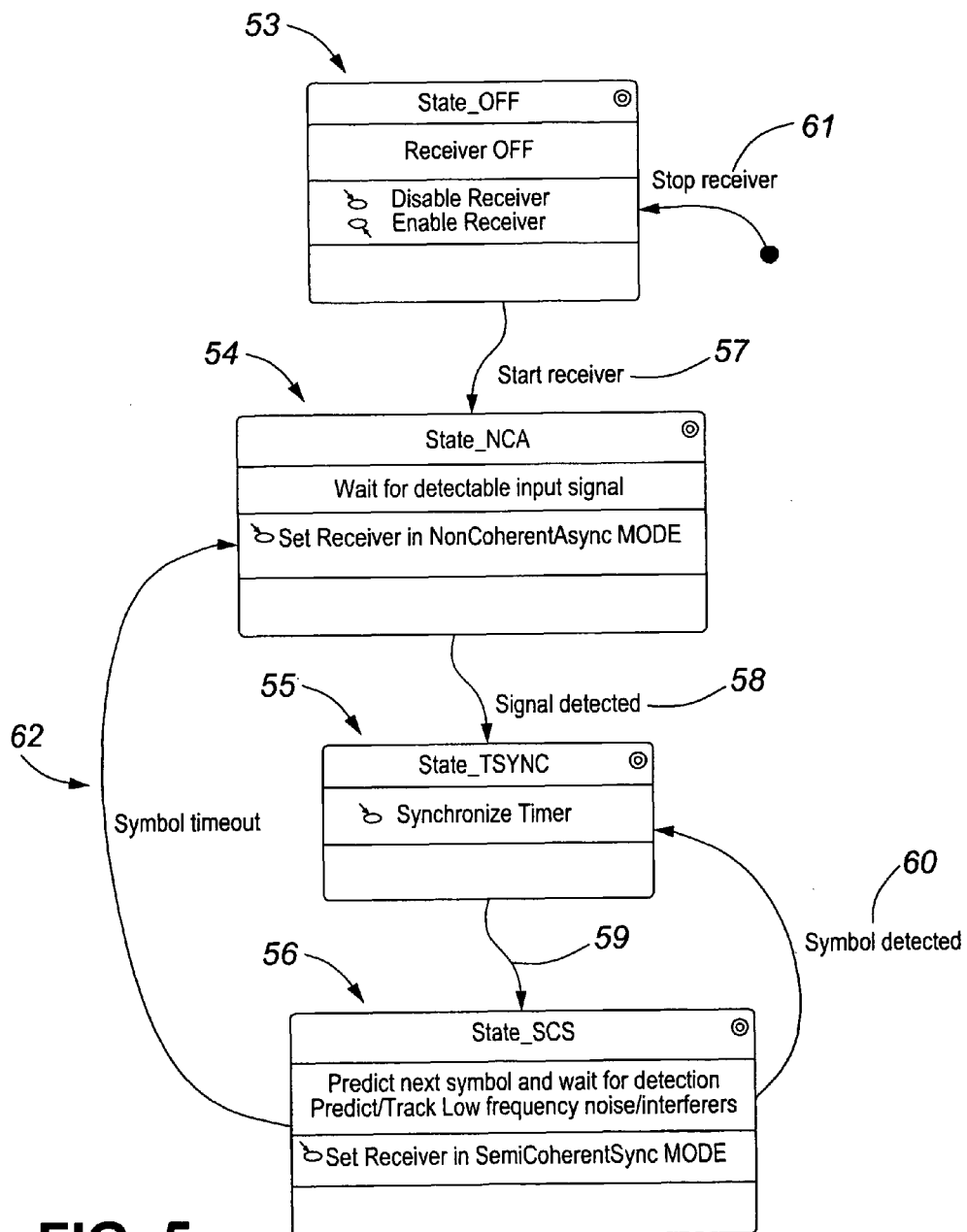
FIG. 5 is a state diagram for the generalized pattern recognition and message synchronization algorithm in accordance with one embodiment of the invention.
Figure 6:
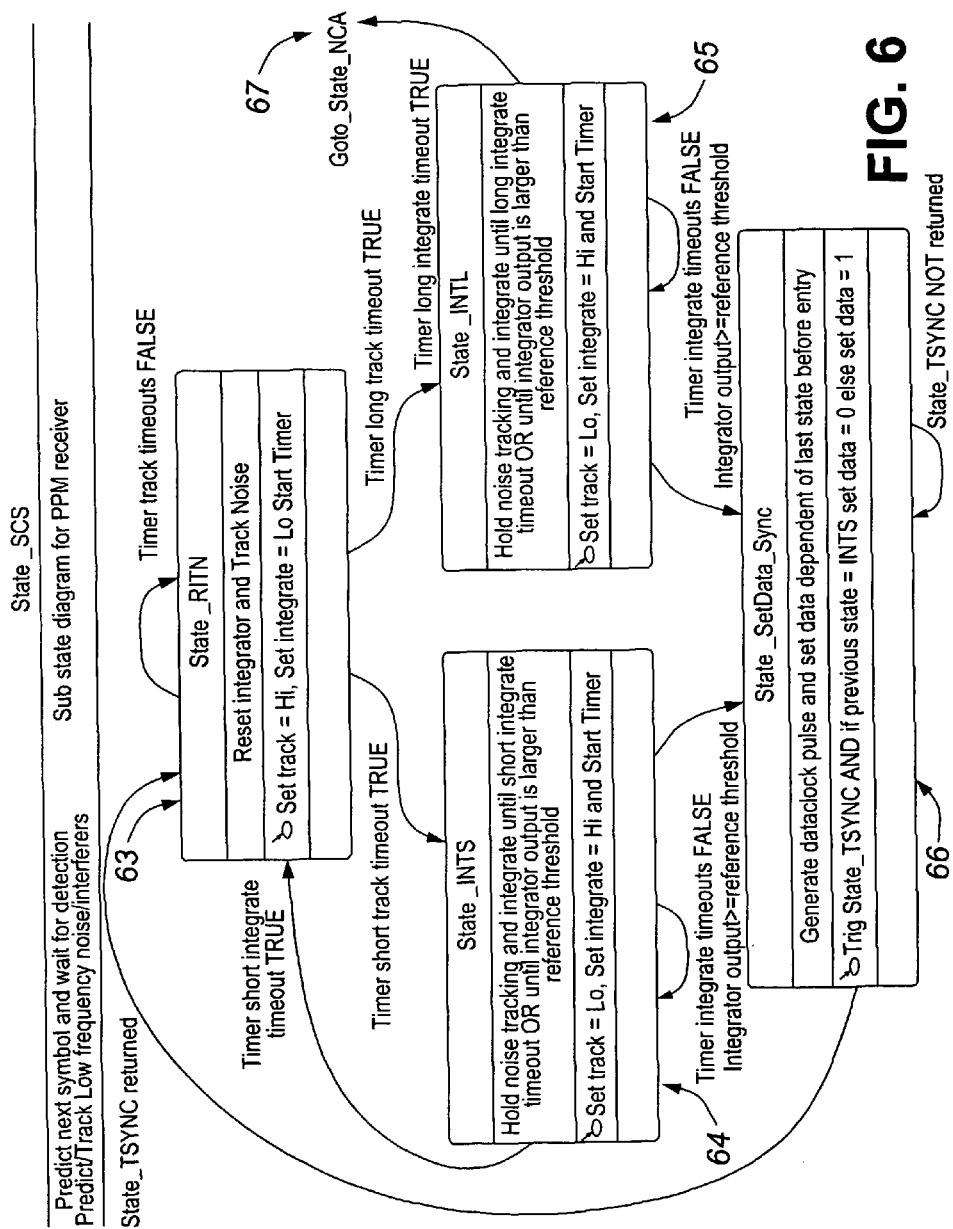
FIG. 6 is a timing diagram for the specific pattern recognition and message synchronization algorithm used in an Ultra Low Power duty cycled receiver for Pulse Position Modulated RF signals.

The operation of blocks 9 and 15 is controlled by the novel inner pattern prediction and recognition process shown in FIGS. 5 and 6, respectively, wherein the pattern is first detected in an asynchronous mode and the rest of the message is then received in a pseudo-synchronous mode.

The inner process comprises a first layer, the implementation of which is dependent on the physical modulation type and in the case of the exemplified ULP receiver which uses PPM and comprises a time based predictor to predict where a pulse can be expected to occur and not expected to occur. It is during this non expectation period that the LF noise is tracked or predicted.

As shown in FIG. 5, the receiver has an initial off state 53. During the state named State_NCA 54, N initial non coherent synchronization phase is active. During states State_TSYNC 55 and State_SCS 56, a second pseudo synchronous phase is active.

The purpose of the State_TSYNC 55 state is to synchronize the timer/predictor (23 of FIG. 3) to the input signal. The purpose of such a synchronization is to allow for a more relaxed clock generation in the timer/predictor 23 without the risk of having not set the integrated signal Hi when a pulse is actually present, which otherwise can result in a lost message. State_SCS 56 is activated by a signal 59 from State_TSYNC 55. The purpose of State_SCS 56 is to predict the next symbol and wait for detection. When a symbol is detected, a signal is sent back to State_TSYNC 55 from State_SCS 56 to synchronize the timer as shown by path 60. The State_SCS 56 is also operable to predict/track low frequency noise/interferes. It also sets the receiver in SemiCoherentSync MODE. In the event of a symbol timeout, the State_SCS 56 sends a signal 62 back to State_NCA 54 to set the receiver in NonCoherentAsync MODE and wait for a detectable input signal. Between State_OFF 53 and State_NCA 54, the receiver is started by a Start receiver signal 57. Between State_NCA 54 and State_TSYNC 55, a signal is detected at 58. The receiver is returned to State_OFF 53 by a Stop receiver signal 61.

FIG. 6 shows the state timing diagram, which comprises states State_RITN 63, State_INTS 64, state_INTL 65, and state State_SetData_Sync 66. Loop 67 leads to State_NCA 54 in FIG. 5.

In State_RITN 63, the receiver resets the integrator 15 (FIG. 2) and tracks noise. In State_INTS 64, the receiver holds the noise tracking and integrates the signal until a short timeout or until the integrator output is larger than a reference threshold. In State_INTL, the receiver holds and integrates the signal until a long timeout or until the integrator output is larger than a reference threshold.

In state State_SetData_Sync 66, the receiver generates data clock pulses and sets the data dependent of the last state before entry.

Figure 3:
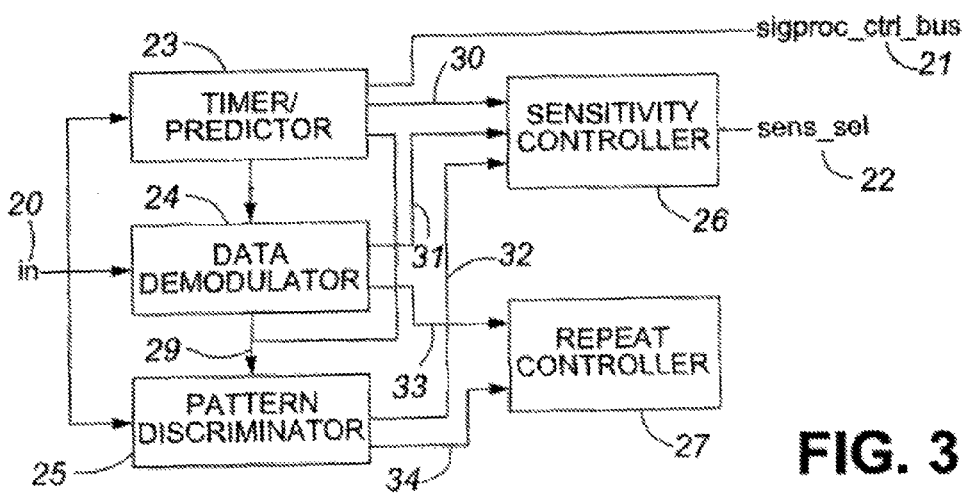
FIG. 3 is a block diagram of the pattern discriminator, data demodulator and control and timing unit.

The pattern discriminator, data demodulator, timing and control unit 4, shown in more detail in FIG. 3, comprises a timer/predictor 23, which may or may not include a clock generator, a data demodulator 24, a pattern discriminator 25, a sensitivity controller 26 and a repeat controller 27.

Figure 4:
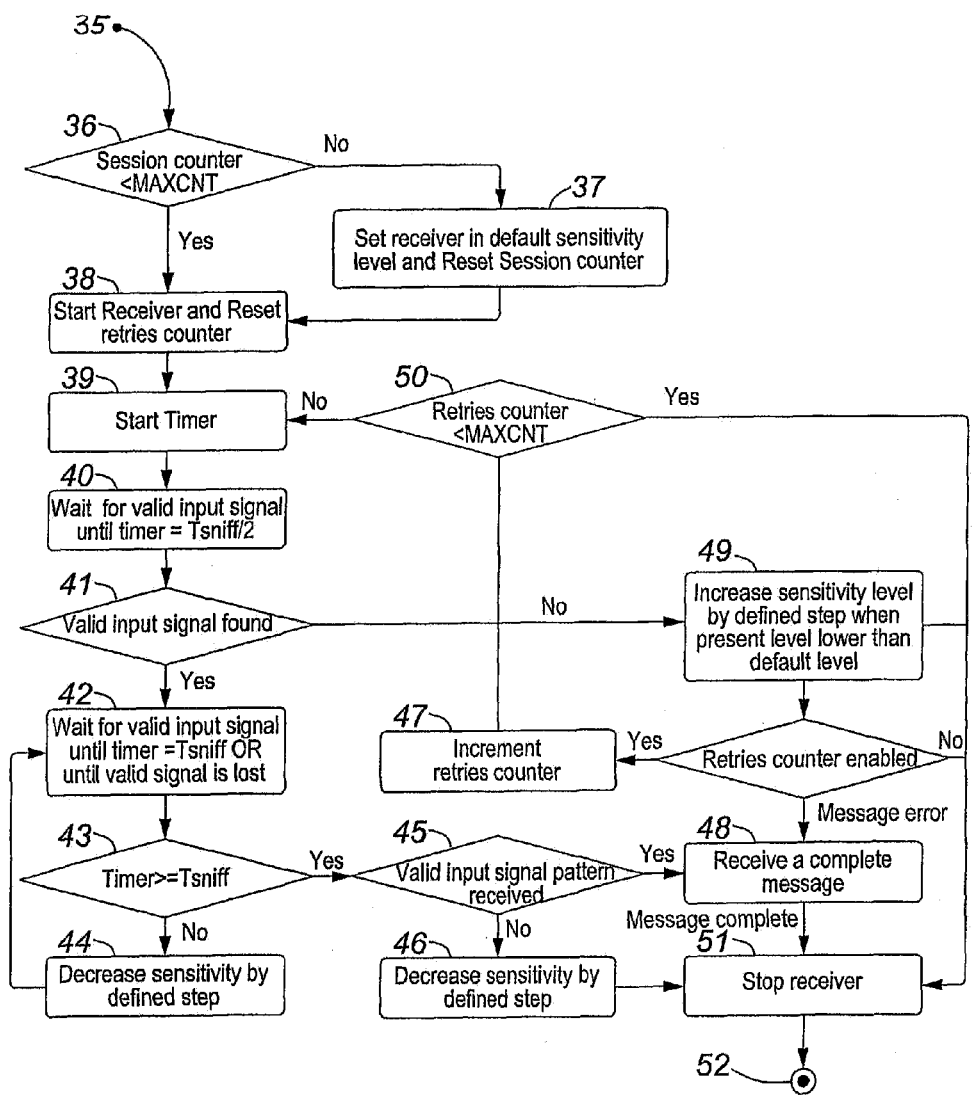
FIG. 4 is a flow chart and activity diagram for the sensitivity and repeat control unit.

To further increase sensitivity and interferer rejection the invention also comprises a method including a process as shown in FIG. 4. In the flow and activity diagram in FIG. 4, entry point 35 is the start of the process and exit point 52 is the end of the process. The process comprises two layers; a first layer which repeatedly receives a data packet if the previously received similar packet is lost due to bit errors. The bit errors can also be referred to as pattern errors and can use any form of encoding, such as Manchester encoding or the like. The process also comprises a second layer, which dynamically adjusts the sensitivity of the physical receiver to reject interference, but which still allows for proper reception of wanted data packets, but at a shorter distance than if no interference was present.

When the process starts at entry point 35, the first task 36 is to check if the number of previous sessions is less than a maximum number (MAXCNT) defining the number of sessions where the sensitivity control is active before a reset to the default sensitivity is performed at 37.

Next the receiver is activated 38 for a defined time (Tsniff), steps 39-40. If no valid signal with a correct pattern is detected after half the time (Tsniff/2) 41, the sensitivity is increased 49 followed by receiver deactivation 51. The sensitivity increase is performed in defined steps and only if the sensitivity during the last Tsniff is lower than the default sensitivity level, which is intended to be the highest level allowed.

If a valid signal with a correct pattern is detected but lost before Tsniff 42 and the time is less than Tsniff 43, the sensitivity is decreased by a defined step 44 followed by continuous reception of the input signal until the time Tsniff. When time Tsniff is reached and a valid input signal is received and detected 45, the complete message or packet is received 48, and if no message or packet error occurs the receiver is deactivated. If a valid input signal is not received 45 when time Tsniff has expired, the sensitivity is decreased by the defined step 46 and the receiver is deactivated 51. If a message or packet error occurs during step 48 and it is not allowed to perform another trial, the receiver is immediately deactivated. If new trials are allowed a counter is incremented at step 47, and if the counter is less than a value MAXCNT 50, not necessarily the same as for step 36, a new time Tsniff is commenced 39. If the answer at 50 is yes the receiver is immediately deactivated. The algorithm then terminates at step 52 until an external event will start the algorithm again at step 35.

It should be appreciated by those skilled in the art that any block diagrams herein represent conceptual views of illustrative circuitry embodying the principles of the invention. For example, a processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The invention claimed is:

1. A wireless receiver for enhancing sensitivity and interference rejection, comprising:
    a RF front end for receiving a signal with an asynchronous characteristic pattern;
    a pattern discriminator coupled to the RF front end for detecting the characteristic pattern in the received signal in an asynchronous mode, the pattern discriminator arranged to save power if the received signal is not identifiable;
    a predictor coupled to the RF front end and arranged to determine a noise floor, and predict, responsive to the determined noise floor, the presence of non-zero values of a subsequently received portion of the received signal in pseudo synchronous mode wherein the pattern is almost coherent;
    a tracker connected with said predictor via a control bus for receiving the predicted non-zero values from the predictor, the tracker tracking a noise component in the received signal between the received non-zero values;
    a subtractor connected with said tracker for subtracting the noise component from the received signal to output a processed signal;
    a demodulator connected with said subtractor for demodulating the processed signal; and
    a comparator connected with said pattern discriminator, said predictor and said demodulator for comparing the outputs thereof to produce a quantized data output signal.

2. The wireless receiver as claimed in claim 1, wherein the received RF signal is pulse encoded, and the predictor predicts times between the pulses of the pulse encoded signal.

3. The wireless receiver as claimed in claim 2, wherein the pulse encoded signal is position pulse encoded.

4. The wireless receiver as claimed in claim 3, wherein the predictor is a time-based predictor that predicts when a pulse is to be expected based on said asynchronous characteristic pattern.

5. The wireless receiver as claimed in claim 1, wherein the tracker comprises a filter controlled by the predictor to track the noise component between pulses.

6. The wireless receiver as claimed in claim 5, further comprising an adaptive sensitivity controller for dynamically adjusting a sensitivity of the receiver in accordance with the reception conditions.

7. The wireless receiver as claimed in claim 6, wherein the sensitivity controller is configured to activate the receiver periodically for a defined time, and if no valid signal is received during this defined time, to stepwise increase the sensitivity if a predetermined maximum threshold sensitivity has not been reached.

8. The wireless receiver as claimed in claim 7, wherein the sensitivity controller is configured to stepwise decrease the sensitivity when a valid signal pattern is detected.

9. The wireless receiver as claimed in claim 1, wherein the receiver is an ultra low power duty cycled receiver.

10. A method of enhancing sensitivity and interference rejection in a receiver, the method comprising the steps of:
    receiving an RF signal with an asynchronous characteristic pattern;
    detecting the asynchronous characteristic pattern in the received RF signal in an asynchronous mode;
    operating to save power if the received RF signal is not identifiable;
    determining a noise floor to predict the presence of non-zero values of a subsequently received portion of the received RF signal in pseudo synchronous mode wherein the asynchronous characteristic pattern is almost coherent;
    tracking a noise component in the received RF signal between the predicted non-zero values;
    subtracting the noise component from the received RF signal to output a processed signal;
    demodulating the processed signal; and
    comparing the processed signal with the received RF signal to produce a quantized output signal.

11. The method as claimed in claim 10, wherein the received RF signal is pulse encoded, and the noise component is predicted between pulses of the pulse encoded signal.

12. The method as claimed in claim 11, wherein the pulse encoded signal is position pulse encoded.

13. The method as claimed in claim 10, and further comprising a step of dynamically adjusting a sensitivity of the receiver in accordance with reception conditions.

14. The method as claimed in claim 10, wherein the receiver is periodically activated for a defined time, and if no valid signal is received during this defined time, a sensitivity is stepwise increased if a predetermined maximum threshold sensitivity has not been reached.

15. The method as claimed in claim 14, wherein the sensitivity is stepwise decreased when a valid signal pattern is detected.

16. The method as claimed in claim 10, wherein the receiver is an ultra low power duty cycled receiver.

17. The method as claimed in claim 10, which is applied in a medical application.

18. The method as claimed in claim 10, which is applied to an implanted or body worn medical device.

* * * * *